(No Model.)
A. M. NAPIER.
KNOB ATTACHMENT.
No. 467,281. Patented Jan. 19, 1892.
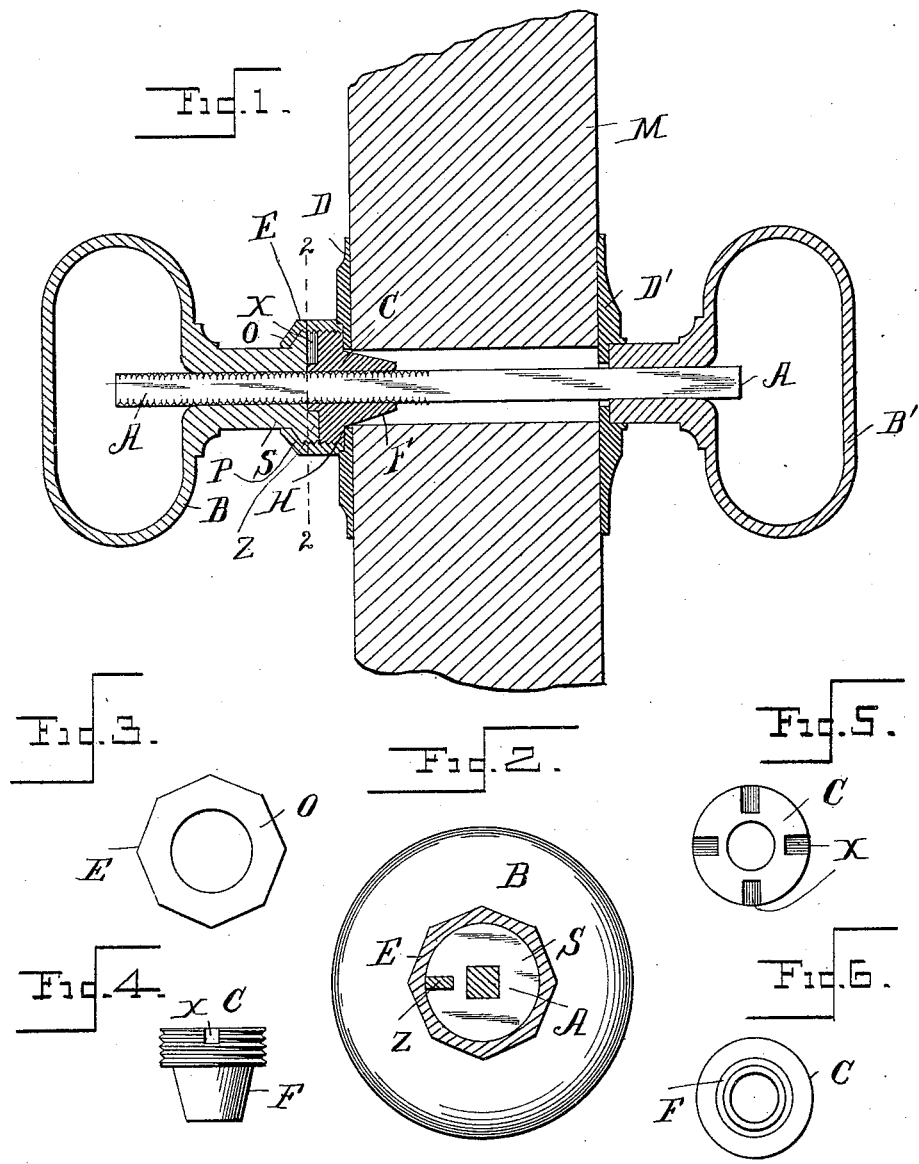
Witnesses
W. R. Courtland
Warren W. Hody
Inventor
Alfred Milton Napier
by A. P. Smith
Atty.

UNITED STATES PATENT OFFICE.

ALFRED MILTON NAPIER, OF BROOKLYN, ASSIGNOR OF ONE-HALF TO ALEXANDER G. CABUS, OF NEW YORK, N. Y.

KNOB ATTACHMENT.

SPECIFICATION forming part of Letters Patent No. 467,281, dated January 19, 1892.

Application filed October 13, 1891. Serial No. 408,576. (No model.)

*To all whom it may concern:*

Be it known that I, ALFRED MILTON NAPIER, a citizen of the United States, residing at Brooklyn, in the county of Kings and State of New York, have invented certain new and useful Improvements in Adjustable Door-Knob Fastenings; and I do hereby declare the following to be a full, clear, and exact description of the invention, such as will enable others skilled in the art to which it appertains to make and use the same.

My invention relates to the class of mechanism by which door-knobs are attached to doors securely and at the same time adjustably.

In the drawings, Figure 1 represents a section of the door with the elements of my invention arranged in their proper relation thereto. Fig. 2 is a section on line 2 2 of Fig. 1. Fig. 3 is a plan view of the internally-threaded thimble. Fig. 4 is a side elevation of the internally and externally threaded sleeve. Fig. 5 is a top plan view of the same. Fig. 6 is a bottom plan view of the same.

The usual method of attaching door-knobs to their respective doors by means of screws passing through the shank of the knob and fitting into perforations in the shaft of the lock is inexact and objectionable, for the screws are continually coming out and the knobs falling off. Various attempts have been made to avoid the faults of this construction, but the resulting apparatus has been complicated and awkward. To avoid the difficulty and have a neat and simple construction which shall securely fasten the knobs to a door of any thickness and yet not form an unsightly excrescence, I have invented the combination of parts hereinafter to be more fully described and claimed.

Referring to the drawings, M is a portion of a door in which a latch (not shown) is set. The latch is operated by the square shaft A and the knobs B B' in the usual manner. The knob B' is permanently fastened to one end of the shaft in any desirable manner, while the other end of the shaft has a screw-thread cut on the corners. Of course the shaft A might be round, with a keyway cut therein, or any other shape given to it so long as the shank S of the knob B could be given a corresponding shape and made to slide thereon without turning. The sleeve C has an internal thread which meshes with the thread on the shaft A. It also has an external thread and a tapering portion F with a face or flange H, so that when the sleeve is screwed down into the rose or washer D it comes to an easy-turning bearing thereon. The rose D' furnishes a similar bearing for the shank of the knob B'.

In the upper face of the sleeve C are one or more recesses $x$. The shank S has a projecting lug Z, which will drop into whichever of the recesses $x$ it comes opposite to. Of course the lug might be on the sleeve and the recesses on the shank, or any other well-known form of interlocking connection substituted for that one illustrated, so long as said connection could be made or broken by simply sliding the shank S along the shaft A.

The thimble E has an internal thread which meshes with the external thread on the sleeve C. The thimble has also an inwardly-projecting flange O, which overhangs a corresponding outwardly-projecting flange P on the shank S. The thimble is given a polygonal outer shape, as shown in Fig. 3, so that a wrench can sieze it.

It is evident that the above arrangement gives the thimble a swivel connection with the shank S and a screw connection with the sleeve C. The same result would be attained if the swivel connection were with the sleeve and the screw connection with the shank, and any construction that secures either of these arrangements may be employed without departing from the spirit and scope of my invention.

The method of operation of my invention is as follows: The shaft A is put through the opening in the door, the roses D D', and in the latch or lock, and the shank of the knob B' brought to a bearing on the rose D'. The sleeve C is then screwed on the other end of shaft A until the tapering portion has entered the circular opening in the rose D and the face H has come to an easy bearing against it. The shank S is then slid down, and the lug Z falls into the nearest recess X. As the knob B and the shank S cannot turn on the shaft, the sleeve C is now evidently also incapable of turning and is locked in its position. The thimble E is then screwed down on the sleeve C until the flange O bears hard on the flange P. This prevents the lug Z from rising out of the recess X, in which it is sunk, and all the parts are permanently locked together. The knob B can be twisted in either direction and submitted to violent shocks without loosening it and without disturbing the sleeve C.

The advantages of the invention are evident. It can be nicely adjusted to any thickness of door without the use of washers. If the shaft A has twenty-five threads to the inch and there are four recesses X, the sleeve C can be adjusted to one one-hundredths of an inch. Only two parts are added to the simplest form of knob now used; or, if the screw used in the ordinary knob be counted, my invention adds only one extra piece. The attachment is so small and compact as to be scarcely noticeable. The operation is simple and convenient. The fastening is secure.

Having therefore described my invention, what I claim as new, and desire to protect by Letters Patent, is—

1. The combination of the square shaft which has a thread set upon its corners, the internally and externally threaded sleeve which screws thereon and has one or more recesses in its outer face, the knob which has a hollow shank that slips over said shaft without turning thereon and which has a projecting lug that may intermesh with any of the above-mentioned recesses, and the thimble provided with an internal thread which meshes with the external thread upon the sleeve and which has also an inwardly-projecting flange which overhangs a corresponding outwardly-projecting flange upon the shank of the knob, substantially as described.

2. The combination, with a door and the roses arranged upon either side thereof, of the shaft which extends therethrough and which is screw-threaded upon one end, the knob provided with a hollow shank which slides onto but does not turn on said threaded end, the internally and externally threaded sleeve which abuts against one of said roses and with which the knob has interlocking connections, and the thimble which has a swivel connection with the knob and a screw connection with the sleeve, substantially as described.

3. The combination of the threaded shaft, the hollow shank which slides but does not turn on said shaft, the internally-threaded sleeve on said shaft, interlocking connections between said sleeve and shank which may be made or broken by the sliding motion of the shank, and the thimble which has a swivel connection to one of said last-mentioned elements and a screw connection to the other, substantially as described.

In testimony whereof I affix my signature in presence of two witnesses.

ALFRED MILTON NAPIER.

Witnesses:
WARREN W. FOSTER,
OLIVER C. SEMPLE.